(12) United States Patent
Boehmer et al.

(10) Patent No.: US 10,408,229 B2
(45) Date of Patent: Sep. 10, 2019

(54) BALANCING DEVICE

(71) Applicant: ERICH F. BAURMANN PNEUMATIK HYDRAULIK INDUSTRIEAUSRÜSTUNGEN, Steinebach (DE)

(72) Inventors: Christoph Boehmer, Wissen (DE); Stefan Boehmer, Wissen (DE)

(73) Assignee: Erich F. Baurmann Pneumatik Hydraulik Industrieausrüstungen, Steinbach (DE)

( * ) Notice: Subject to any disclaimer, the term of this patent is extended or adjusted under 35 U.S.C. 154(b) by 0 days.

(21) Appl. No.: 15/907,909

(22) Filed: Feb. 28, 2018

(65) Prior Publication Data

US 2018/0252235 A1    Sep. 6, 2018

(30) Foreign Application Priority Data

Mar. 1, 2017   (EP) ..................... 17158764

(51) Int. Cl.
*F04D 29/66* (2006.01)
*G01M 1/04* (2006.01)
(Continued)

(52) U.S. Cl.
CPC ......... *F04D 29/662* (2013.01); *F04D 25/024* (2013.01); *F04D 29/668* (2013.01);
(Continued)

(58) Field of Classification Search
CPC ...... F04D 25/024; F04D 29/66; F04D 29/661; F04D 29/662; F04D 29/668; G01M 1/04;
(Continued)

(56) References Cited

U.S. PATENT DOCUMENTS 4,864,859 A      9/1989  Jensen
9,261,110 B2 *   2/2016  Buzzi ................... F04D 29/662
(Continued)

FOREIGN PATENT DOCUMENTS

DE     102005053786 A1    5/2007

OTHER PUBLICATIONS

Extended EP Search Report for Corresponding EP Patent Appln. No. 17158764.5 dated Sep. 18, 2017.

*Primary Examiner* — Prasad V Gokhale
(74) *Attorney, Agent, or Firm* — Berenato & White, LLC

(57) ABSTRACT

A balancing device for turbochargers comprises a base body having a centrally disposed receiver. A rotation element to be balanced can be axially inserted to hold the rotation element in the receiver such as to turn about its axis of rotation. A number of hydraulic cylinders are arranged around the central receiver on the base body for fixing a core assembly of the turbocharger in the central receiver. The base body is in the form of a decoupling plate having an inner plate section and a stationarily positioned outer plate section elastically connected to the inner plate section and surrounding the inner plate section. The decoupling plate has a number of peripheral slots resiliently decoupling the inner plate section from the outer plate section such that a number of separate holding sections are formed on the de-coupling plate.

19 Claims, 4 Drawing Sheets

(51) Int. Cl.
   *F04D 25/02* (2006.01)
   *F01D 5/02* (2006.01)
   *F01D 25/28* (2006.01)

(52) U.S. Cl.
   CPC ............... *G01M 1/04* (2013.01); *F01D 5/027* (2013.01); *F01D 25/285* (2013.01); *F05D 2220/40* (2013.01); *F05D 2260/15* (2013.01)

(58) Field of Classification Search
   CPC   G01M 1/22; G01M 1/36; F01D 5/027; F05D 2260/15
   USPC .......... 74/570.2, 571.1, 571.11, 572.2, 573.1
   See application file for complete search history.

(56)            References Cited

U.S. PATENT DOCUMENTS

2008/0289416 A1    11/2008  Thelen
2015/0285262 A1*   10/2015  Fabre .................... B64C 11/306
                                                          416/1
2015/0361992 A1*   12/2015  Tezuka ................... G01M 1/04
                                                          415/213.1
2018/0320551 A1*   11/2018  Iijima ....................... F01D 3/04

\* cited by examiner

BALANCING DEVICE

CROSS-REFERENCE TO RELATED APPLICATIONS AND CLAIM TO PRIORITY

This application is related to application number 17 158 764.5, filed Mar. 1, 2017, with the European Patent Office, the disclosure of which is incorporated herein by reference and to which priority is claimed.

FIELD OF THE INVENTION

The present invention relates to a balancing device, in particular for turbochargers, comprising a base body which has a centrally disposed receiver into which a rotation element to be balanced, in particular a core assembly of a turbocharger, can be axially inserted in order to hold the rotation element in the receiver such as to turn about its axis of rotation, a number of hydraulic cylinders arranged around the receiver being provided on the base body, by means of which hydraulic cylinders the rotation element is fixed or can be fixed in the central receiver.

BACKGROUND OF THE INVENTION

Balancing devices of the type specified above for dynamically measuring imbalances on a rotation element are generally known. In particular with turbochargers it is necessary to measure rotation speeds of between 20,000 and over 200,000 revolutions a minute and the imbalances and vibrations that occur here.

For this purpose, it is proposed in the prior art to insert the rotation element—here in the form of a core assembly of a turbocharger which is composed of a compressor wheel and a turbine wheel which are coupled to one another by a shaft with a shaft nut for dynamically measuring imbalances in one or more planes—into the balancing device. For this purpose, the core assembly is pushed into a central receiver formed in the balancing device and is fixed therein. Next, the rotation element is set in rotation, and imbalances of the rotation element are detected by sensors.

The core assembly is often fastened in the balancing device by bolts attached to the central receiver. However, it is a disadvantage of this type of solution that in each case it takes a great deal of time to fix the core assembly in place, and this considerably extends the cycle times of the balancing device.

In order to reduce the cycle times, it has been proposed in the prior art to fix the core assembly to a support structure in the central receiver, the support structure being displaced parallel to the axis of rotation of the core assembly. However, this form of support structure is very cumbersome and solid, and so increases the masses to be accelerated in the balancing process, and this may lead to falsification of the balancing result.

In order to overcome this problem, it is proposed in U.S. Pat. No. 9,261,110 B2 to also provide a base body on which a core assembly is received in a central receiver formed in the base body. Here the base body is in the form of a decoupling element which has a basic structure which elastically surrounds a supporting structure. The elasticity is achieved by providing spring elements. This means that structures are cut out of the decoupling element by means of wire-electro discharge machining such that the base element and the supporting element are elastically connected to one another by springs formed by the wire-electro discharge process.

However, a disadvantage of this design of decoupling element is that the core assembly must be fastened to the structure by hydraulic cylinders fastened to the base element. In order to counteract an associated increase in mass, in U.S. Pat. No. 9,261,110 B2 it is proposed to provide window elements between the hydraulic cylinders fixed to and pre-stressed on the decoupling element and the core assembly that is to be fixed, which window elements should enable resilient punctiform fixing of the core assembly within the central receiver. However, it is very complex to produce these windows reproducibly.

On the other hand, if the balancing device is not fitted correctly, for example if the core assembly is not inserted, there is the risk that, due to the radial forces exerted by the hydraulic cylinders upon the axial fixing of the core assembly and the associated forces exerted upon the decoupling element, the hydraulic cylinders as well as the window elements will move into the receiver so that the spring elements formed between the base structure and the support structure will ultimately break. As a consequence, the entire decoupling element made in one part must be replaced because the spring elements provided between the base element and the supporting element cannot be replaced.

SUMMARY OF THE INVENTION

It is therefore the object of the present invention to provide a balancing device which has a simpler and more reliable structure.

This object is achieved by the characterising features of Claim 1 by the base body being in the form of a decoupling plate which has an inner plate section and a stationarily positioned outer plate section elastically connected to the inner plate section and surrounding the inner plate section, the base body having a number of peripheral slots by means of which the inner plate section is resiliently decoupled from the outer plate section such that a number of holding sections, separate from one another, are formed on the decoupling plate.

In other words, according to the invention provision is made to dispense with the individual spring elements between the plate elements known in the prior art, and instead to provide peripheral slots arranged over the decoupling plate in the circumferential direction, which slots make it possible for the inner plate section, detached from the fixed outer plate section, to move resiliently.

The decoupling plate is divided into two plate sections—an inner and an outer plate section—by providing the peripheral slots. The result of this is that the inner plate section is separated from the outer, fixed plate section by the peripheral slots, and so is held elastically to a sufficient extent with respect to the outer plate section.

The decoupling plate itself, made in one part, remains substantially stable here, and this has a positive effect in the event of incorrect fitting of the balancing device because the stability of the decoupling plate is substantially maintained, and so, for example, overloading is successfully counteracted as with the spring elements known from the prior art.

In a preferred embodiment of the invention, provision is made such that the peripheral slots each extend over a length of at least 70%, in particular at least 80%, of the entire length of the respective holding section on the decoupling plate.

Preferably, the decoupling plate is circular in form and the peripheral slots of the holding sections each run parallel to the outer walls of the outer plate section.

The peripheral slots each define at least one holding section, the peripheral slots being formed along the inner and the outer plate section such that they are adapted to the type of forces and torques to be anticipated when the rotation element is rotated.

In end regions of the peripheral slots recesses, in particular in the form of spring bars or spring tabs, can at least partially be provided in the decoupling plate. Here the spring bars or tabs can run parallel to one another in the end regions of the peripheral slots, and in particular are aligned parallel to a longitudinal centre plane of the decoupling plate lying between the holding sections.

Adjacent holding sections may be directly separated from one another by providing at least one recess if, for example, peripheral slots of the two adjacent holding sections lead into the same recess. It is thus possible to directly separate at least two adjacent peripheral slots from one another by means of respectively radially running recesses.

Alternatively, it is also possible to arrange the peripheral slots spaced apart from one another and, in order to form the holding sections, at least partially overlapping in their end regions or to position recesses in the end regions of the peripheral slots so that they are arranged overlapping.

According to one embodiment of the invention provision is made such that an even number of holding sections are arranged on the base plate which can in particular be formed mirror symmetrically to a longitudinal centre plane of the decoupling plate.

Alternatively, it is also possible to provide a total of three holding sections on the decoupling plate which in particular each extend in an angular range of at least 70°, in particular at least 80° and particularly preferably at least 100° along the circumference of the base body.

Of course, it is also possible to provide a total of two pairs of holding sections which are arranged and formed mirror symmetrically in relation to two longitudinal centre planes of the base body standing perpendicular to one another.

The peripheral slots and/or the recess can be made in the base body by means of water jet cutting and/or wire-electro discharge machining.

In one particularly preferred embodiment of the present invention, provision is furthermore made such that the rotation element is braced or can be braced in the central receiver of the base body by substantially axial displacements of the hydraulic cylinders provided on the holding sections.

If the hydraulic cylinders are arranged on and fastened to the inner plate section, it is possible for all of the other masses provided on the balancing device to remain on the outer plate section fixed stationarily to the balancing device so that the rotation movement of the rotation element can take place with clearly less additional mass because only one rotation of the inner plate section together with the hydraulic cylinders can take place. The risk of falsifying the measurements taken can thus be clearly reduced.

The hydraulic cylinders can be moved axially within the inner plate section, i.e. parallel to the axis of rotation of the rotation element such that lever elements adjoining the hydraulic cylinders can be tilted by the axial displacement of the latter so that a force-fit and/or form-fit connection between the lever elements and the rotation element is established.

One improvement of the automatability of the method for balancing core assemblies and rotation elements makes provision to provide a number of pneumatic cylinders on the outer fixed plate section in order to position the hydraulic cylinders and/or the lever elements on the rotation element to be fastened after inserting the rotation element into the central receiver, and then to move the pneumatic cylinders fastened stationarily to the outer plate section back in the central receiver after fixing the rotation element by means of the lever elements. It is thus possible to provide automatic positioning of the lever elements on the rotation element that is to be fastened and to prevent further masses that have a negative impact upon the vibration of the rotation element from affecting the balancing process, for example by means of the pneumatic cylinders.

In order to also enable fast removal of the base body from the balancing device, for example when the outer dimensions of the rotation element or the core assembly are changed, in one exemplary embodiment provision is made such that the balancing device has a base plate by means of which the balancing device can be supplied, for example, with compressed air and hydraulic oil, onto which an adapter plate provided on the base body can easily be pushed. Thus, when changing tools, additional procedural steps such as, for example, providing a supply of air or hydraulic oil or similar, are no longer necessary.

With regard to another advantageous embodiment of the invention, reference is made to the sub-claims and to the following description of exemplary embodiments using the drawings.

DETAILED DESCRIPTION OF THE PREFERRED EMBODIMENT(S)

Figure 1:
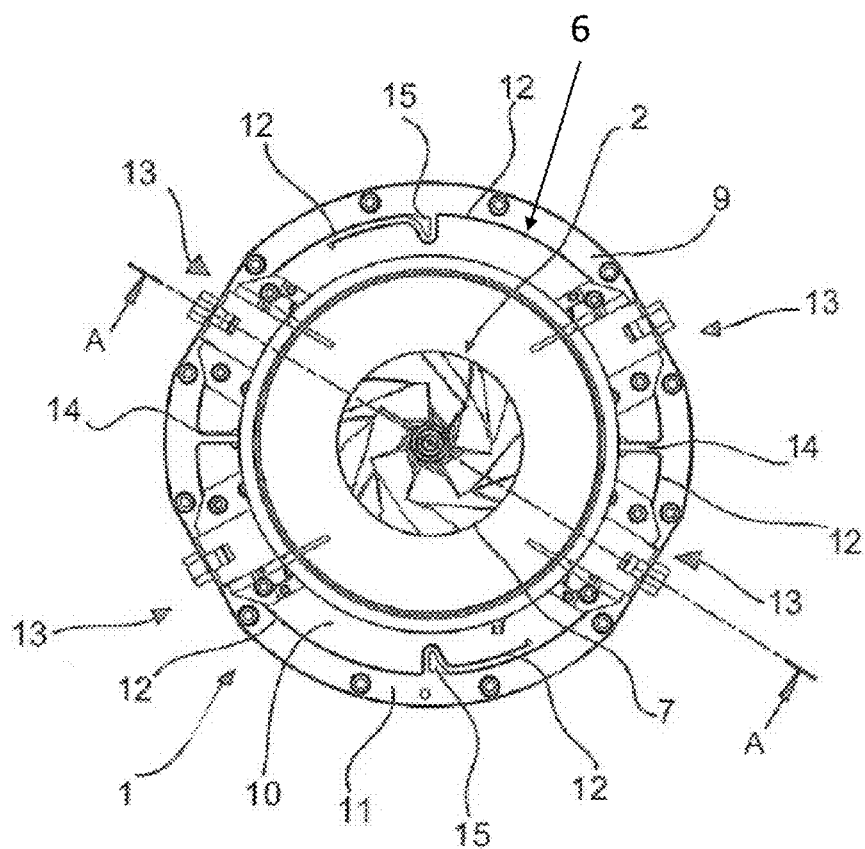
FIG. 1 a top view of a decoupling plate according to the invention.
Figure 2:
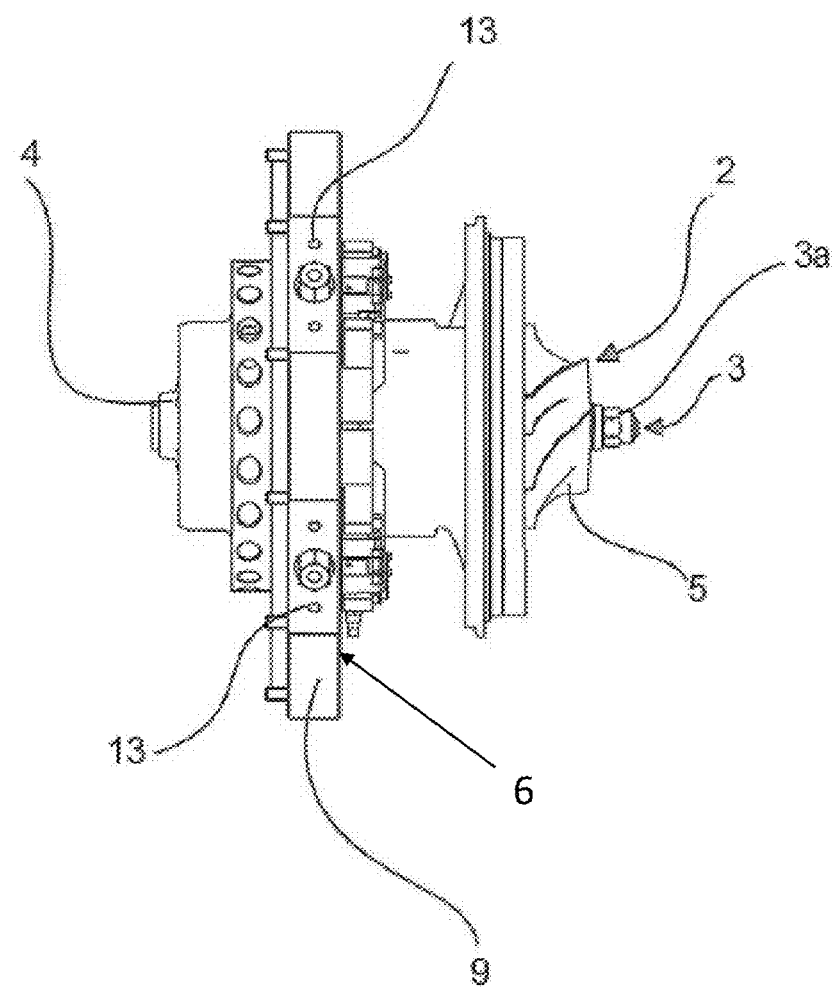
FIG. 2 a decoupling plate according to the invention with an inserted core assembly, from the side.
Figure 3:
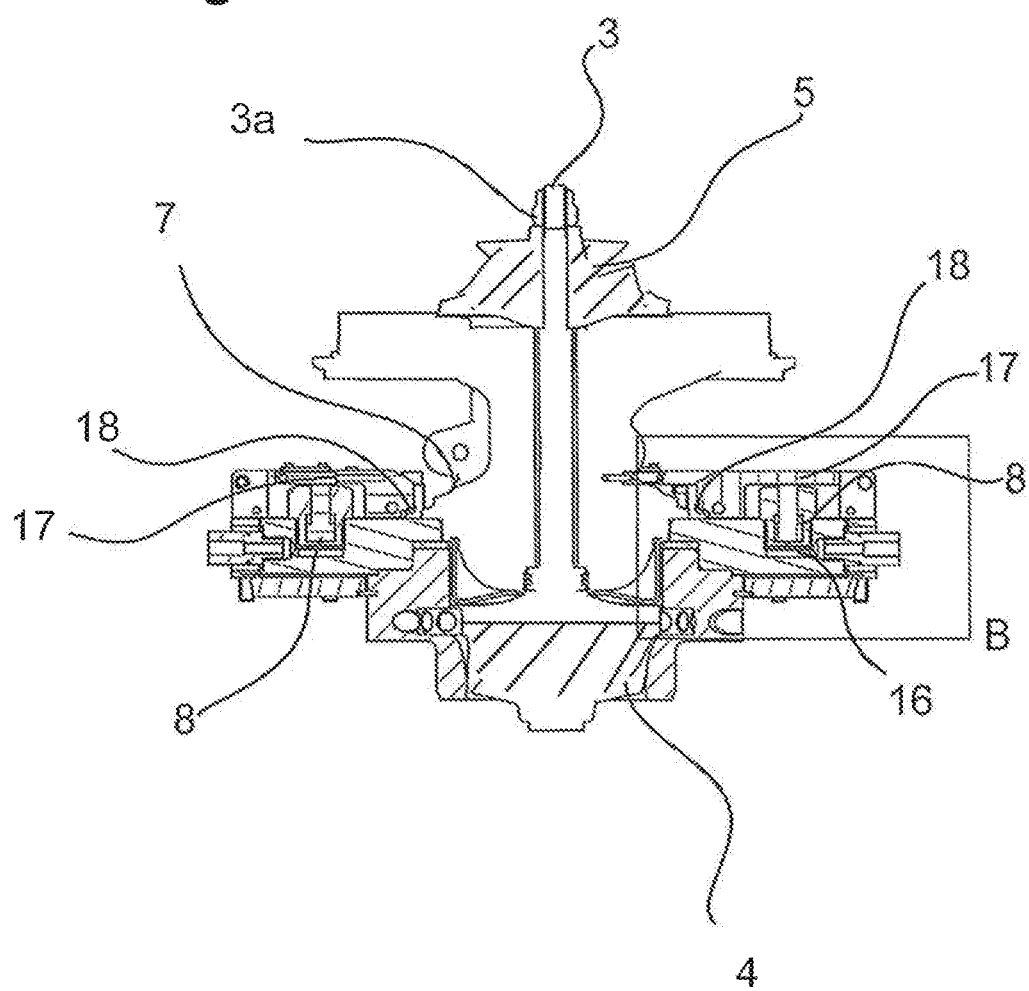
FIG. 3 a sectional illustration of the decoupling plate along section line AA according to FIG. 1.
Figure 4:
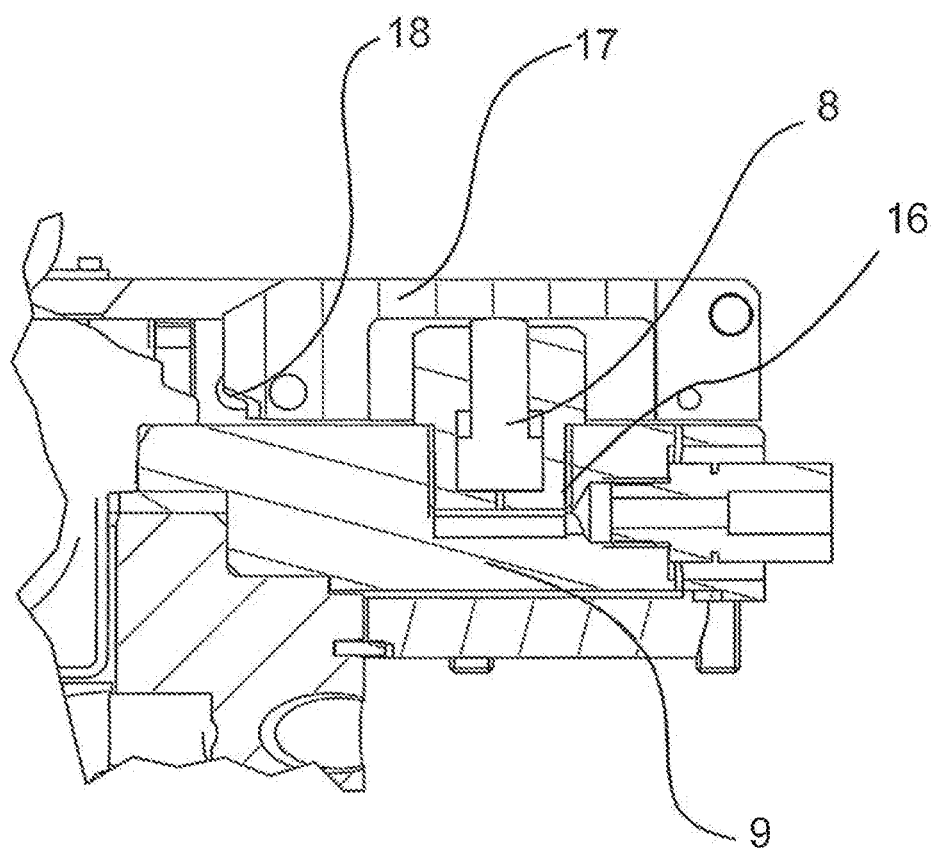
FIG. 4 a partial illustration of the coupling plate according to the invention with the core assembly inserted according to rectangle B in FIG. 3.

FIG. 1 shows a balancing device 1 for a core assembly 2 of a turbocharger. The core assembly 2 comprises a shaft 3 to each of the ends of which a turbine wheel 4 and a compressor wheel 5 of the turbocharger are fastened and fixed in place by means of a shaft nut 3a.

The balancing device 1 is provided with a base body 6 which has a centrally positioned receiver 7 in order to insert the core assembly 2 into the receiver 7 and to keep the rotation element 3, 4, 5 turning about its axis of rotation by means of bearings (not detailed). Provided on the base body 6 are a number of hydraulic cylinders 8 arranged around the receiver 7, by means of which the core assembly 2 is fastened in the central receiver 7.

The base body 6 has a circular decoupling plate 9 which comprises an inner plate section 10 and an outer plate section 11 disposed stationarily in the balancing device 1, elastically connected to the inner plate section 10 and surrounding the inner plate section 10.

In the decoupling plate 9, arranged along the circumference of the de-coupling plate 9, i.e. along an arc of a circle around the central axis of rotation of the rotation element 3, 4, 5, peripheral slots 12 are provided by means of which the inner plate section 10 is resiliently decoupled from the outer plate section 11.

The peripheral slots 12 are arranged here so that they extend almost along the entire circumference of the decoupling plate 9. The individual peripheral slots 12 are spaced apart from one another so that four separate holding sections 13 are formed in the decoupling plate 9. For this purpose, the peripheral slots 12 are respectively arranged over a length of 80° of the circumferential length of each holding section 13 of the decoupling plate 9.

In the end regions of the peripheral slots 12 recesses in the form of spring bars 14 and spring tabs 15 are provided in the decoupling plate 9, which recesses are formed adapted to the anticipated loading in the holding sections 13, i.e. in the region of anticipated bending and torsion forces as spring tabs 15, in the region of anticipated linear forces caused by upwards and downwards movements as spring bars 14.

As can be seen more precisely in FIG. 1, the end regions of the peripheral slots 12 in the 12 o'clock position and in the 6 o'clock position are spring tabs 15 which are arranged so that, spaced apart from one another, they overlap in the region of the formation of the tab form and are appropriate for compressing vibrations due to rotations.

However, in the 3 o'clock and in the 9 o'clock position the end regions of two adjacent peripheral slots 12 are in the form of spring bars 14 which extend spaced apart from one another parallel to the axis centre point of the decoupling plate 9.

In order to fix the core assembly 2 to the decoupling plate 9, four holding sections 13 provide an even number thereof which are arranged mirror symmetrically to a longitudinal centre plane of the decoupling plate 9.

In an exemplary embodiment which is not shown, only three holding sections are provided on the decoupling plate 9 which each extend over an angular range of 100° along the circumference of the base body 6. However, this embodiment will not be discussed any further in this exemplary embodiment.

In the present exemplary embodiment, the peripheral slots 12 and the recesses 14, 15 are made in the decoupling plate 9 by means of water jet cutting. Accordingly, the decoupling mat 9 is, furthermore, made in one part. By means of the various embodiments of the peripheral slots 12 and the recesses 14, 15 and the bars 14a, 15a formed between them, resilient mounting of the inner plate section 10 by the fixed outer plate section 11 with equalisation of force effects is achieved due to the rotation and the mass movements of the various components. This can be equated with de-coupling of the inner plate section 10 from the fixed outer plate section 11 which is associated with a clear reduction of the masses to be moved during the balancing process.

In order to fix the core assembly 2 in the central receiver 7 of the de-coupling plate 9, pneumatic cylinders attached to the outer plate section 11, but not illustrated, are first of all moved out. This movement of the pneumatic cylinders brings about a substantially force-free displacement of the hydraulic cylinders 8 disposed on the inner plate section 10 within a recess 16 provided in the inner plate section 11. By positioning the hydraulic cylinders, lever elements 17 adjoining the hydraulic cylinder 8 can be tilted, and this enables fixing of the core assembly 2 by means of holding flanges 18 provided on the latter.

This takes place by means of a substantially axial displacement of the hydraulic cylinders 8, i.e. also axially parallel to the central axis of the core assembly 2, and this leads to tilting of the adjoining lever elements 17, as a result of which the lever elements 17 are connected to the holding flange 18 of the core assembly 2, and so the core assembly 2, in the tensed position, is fixed to the inner plate section 11. In other words, a force-fit and/or form-fit connection between the lever elements 17 and the core assembly 2 is achieved by the substantially axial or axially parallel displacement of the hydraulic cylinders 8.

The invention claimed is:

1. A balancing device for turbochargers, comprising
   a base body which has a centrally disposed receiver wherein a rotation element to be balanced can be axially inserted in order to hold the rotation element in the receiver such as to turn about its axis of rotation; and
   a number of hydraulic cylinders arranged around the central receiver being provided on the base body, by means of which hydraulic cylinders the rotation element can be fixed in the central receiver,
   wherein the base body is in the form of a decoupling plate which has an inner plate section and a stationarily positioned outer plate section elastically connected to the inner plate section and surrounding the inner plate section, the decoupling plate having a number of peripheral slots by means of which the inner plate section is resiliently decoupled from the outer plate section such that a number of separate holding sections are formed on the decoupling plate.

2. The balancing device according to claim 1, wherein the peripheral slots each extend over a length of at least 70% of the entire length of each holding section of the decoupling plate.

3. The balancing device according to claim 2, wherein in the end regions of the peripheral slots (12) recesses, spring bars or spring tabs are at least partially provided in the decoupling plate.

4. The balancing device according to claim 2, wherein the peripheral slots are formed spaced from one another and overlap at least partially in their end regions so as to form the holding sections.

5. The balancing device according to claim 2, wherein an even number of holding sections are provided which are arranged and formed mirror symmetrically to a longitudinal center plane of the decoupling plate.

6. The balancing device according to claim 1, wherein in the end regions of the peripheral slots recesses, spring bars (14) or spring tabs (15) are at least partially provided in the decoupling plate (9).

7. The balancing device according to claim 6, wherein at least two adjacent peripheral slots are directly separated from one another by respectively radially running recesses.

8. The balancing device according to claim 7, wherein an even number of holding sections are provided which are arranged and formed mirror symmetrically to a longitudinal center plane of the decoupling plate.

9. The balancing device according to claim 6, wherein the peripheral slots are formed spaced from one another and overlap at least partially in their end regions so as to form the holding sections.

10. The balancing device according to claim 6, wherein an even number of holding sections are provided which are arranged and formed mirror symmetrically to a longitudinal center plane of the decoupling plate.

11. The balancing device according to claim 1, wherein the peripheral slots are formed spaced apart from one another and overlap at least partially in their end regions so as to form the holding sections.

12. The balancing device according to claim 11, wherein an even number of holding sections are provided which are arranged and formed mirror symmetrically to a longitudinal center plane of the decoupling plate.

13. The balancing device according to claim 1, wherein an even number of holding sections are provided which are arranged and formed mirror symmetrically to a longitudinal center plane of the decoupling plate.

14. The balancing device according to claim 1, wherein a total of three holding sections are provided on the decoupling plate which each extend over an angular range of at least 70° along the circumference of the base body (6).

15. The balancing device according to claim 1, wherein the peripheral slots or the recesses are made in the base body by means of water jet cutting and/or by means of wire-electro discharge machining.

16. The balancing device according to claim 1, wherein the rotation element is braced in the central receiver of the base body by substantially axial displacement of the hydraulic cylinders.

17. The balancing device according to claim 1, wherein the hydraulic cylinders are arranged on or fastened to the inner plate section.

18. The balancing device according to claim 1, wherein the hydraulic cylinders can be moved within the inner plate section axially parallel to the axis of rotation of the rotation element such that the lever elements adjoining the hydraulic cylinders are displaced such that a force-fit and/or form-fit connection between the lever elements and the core assembly is established.

19. The balancing device according to claim 1, wherein a number of pneumatic cylinders are provided on the outer fixed plate section in order to position the hydraulic cylinders and/or the lever elements on the core assembly.

* * * * *